United States Patent [19]
Yasuda

[11] Patent Number: 6,033,807
[45] Date of Patent: Mar. 7, 2000

[54] LITHIUM NICKELATE POSITIVE ACTIVE MATERIAL, PRODUCING METHOD THEREOF AND LITHIUM BATTERY EQUIPPED WITH THE ACTIVE MATERIAL

[75] Inventor: Hideo Yasuda, Kyoto, Japan

[73] Assignee: Japan Storage Battery Co., Ltd., Kyoto, Japan

[21] Appl. No.: 08/895,574

[22] Filed: Jul. 16, 1997

[30]   Foreign Application Priority Data

Jul. 16, 1996   [JP]   Japan ..................................... 8-206612

[51] Int. Cl.[7] .................................................. H01M 4/026
[52] U.S. Cl. .................. 429/231.95; 429/223; 429/231.3
[58] Field of Search .................................. 429/223, 231.3

[56]         References Cited

U.S. PATENT DOCUMENTS 5,804,335   9/1998   Kamauchi et al. ..................... 428/218

FOREIGN PATENT DOCUMENTS 0 571 858   12/1993   European Pat. Off. .
0 720 247   7/1996   European Pat. Off. .

OTHER PUBLICATIONS

Seung–Joo Lee et al., "Fabrication of Thin Film LiCoO.5NiO.5O2 Cathode for Li Rechargeable Microbattery," J. Electrochem. Soc., 143(11), pp. L268–L270 Nov. 1996.

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57]         ABSTRACT

A positive active material contains lithium nickel-cobaltate, and its crystal structure is amorphous. The positive active material can further contain phosphorus. The cobalt in the positive active material can be present in a content in the range of 2 to 60 mol % (Co/(Ni+Co)). A lithium battery can contain the positive active material.

13 Claims, 1 Drawing Sheet

LITHIUM NICKELATE POSITIVE ACTIVE MATERIAL, PRODUCING METHOD THEREOF AND LITHIUM BATTERY EQUIPPED WITH THE ACTIVE MATERIAL

BACKGROUND OF THE INVENTION

1. Field of the Invention

The present invention relates to an amorphous lithium nickelate positive active material containing cobalt as a lithium nickelate positive electrode and a producing method thereof.

2. Description of the Related Art

In recent years, with development of a portable electronic appliance, a high performance battery has been demanded. A lithium battery with a negative electrode of carbon and a positive electrode of lithium cobaltate which is composite oxide in layered structure has been put into practice as a non-aqueous battery having a high operating voltage and high energy density. However, $LiCoO_2$ is expensive and poor in resources. For this reason, lithium containing manganese composite oxide or lithium nickelate has been proposed as an alternative material. However, the battery, which uses the lithium containing manganese composite oxide, has disadvantages of a low theoretical capacity density and great reduction in capacity with an advance of a charge/discharge cycle.

On the other hand, $LiNiO_2$ (lithium containing oxide) is a layered compound having the same crystalline structure as that of $LiCoO_2$ which has been put into practice and contains lithium inserted between the layers of the edge share of $NiO_6$ octahedra. It can be generally fabricated in such a manner that a nickel source such as $Ni(NO_3)_2$, $Ni(OH)_2$, $NiCO_3$ or NiO, and NiOOH, etc. and a lithium source such as LiOH, $LiNO_3$ or $Li_2CO_3$ and $Li_2O_2$, etc. are mixed and the mixture thus formed is heat treated in an atmosphere of about 600° C. to 900° C.

As reported in "Solid State Ionics", 44, 87, 1990; "Chem. Express. 7, 689, 1992; or "Dai 33 Kai Denchi Tooronkai Kooen Youshi Shuu", its structure is similar to the structure of rock salt so that nickel is replaced by lithium ions to provide a disordered structure, thus reducing the capacity. In order to obviate such difficulty, an attempt to use nickel oxyhydroxide as the nickel material has been made. For example, Unexamined Japanese Patent Publication (kokai) No. Sho. 63-19760 proposes to use nickel oxyhydroxide containing Co of 20 to 75% as an active material for a lithium battery.

Further, in order to improve the discharging characteristic, Unexamined Japanese Patent Publication (kokai) No. Hei. 6-31045 proposes to mix hydroxide containing or oxide containing trivalent nickel ions with lithium salt and heat-treat the mixture thus formed. According to this proposal, hypochlorite solution, chlorine-containing solution or bromine containing solution is reacted with bivalent nickel hydroxide dispersed in sodium hydroxide (NaOH) solution to fabricate nickel oxyhydroxide. The hydroxide or oxide containing nickel oxyhydroxide is mixed with lithium nitrate. The mixture is pressurized, molded or dried and heated in air at 600° C. to 800° C. The resultant mold is crushed and molded again, and heat-sintered in air at 700° C. to 900° C. to create lithium nickelate.

However, the above process has the disadvantage that it was difficult to create pure lithium oxide nickel; the voltage of the charging/discharging characteristic varies at plural stages, e.g. four stages; and the high rate discharge performance is reduced.

On the other hand, the synthesis process of lithium nickelate not by a chemical method but an electro-chemical method is disclosed in Soviet Electrochem., 6, 1268, 1970, GS News 37, 84 (1978) and GS News 45, 23 (1986). But these references only describe the electrode behavior regarding an alkaline battery.

An application of such lithium nickelate fabricated electrochemically to the lithium battery is disclosed in Unexamined Japanese Patent Publication (kokai) No. Sho. 63-19761. This reference proposes to use nickel hydroxide charged in a lithium hydroxide solution as an active material. The process of its fabrication is likely to become complicated so that the stabilized active material cannot be obtained as the case may be.

Unexamined Japanese Patent Publication (kokai) No. Sho. 63-19760 reports that trivalent or lower oxidizing state of nickel can be discharged in an non-aqueous solution, e.g. nickel oxyhydroxide (trivalent oxidizing state of nickel) containing cobalt with lithium ions inserted is discharged at 2.7 to 2.4 V.

Solid State Ionics 44, 87 (1990) reports that although $LiNiO_2$ can be discharged to become $Li_2NiO_2$, its discharging potential varies at several stages so that $LiNiO_2$ in a hexagonal structure becomes $Li_2NiO_2$ in a rhombic structure. However, this reference does not clarify whether or not the positive electrode active material has high capacity.

Generally, the capacity of the conventional nickel oxide lithium is at most about 200 mAH/g. In addition, the theoretical capacity density is considered 275 mAh/g based on one electron change reaction of Equation (1) so that implementation of its higher capacity has been demanded.

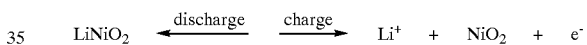

$$LiNiO_2 \underset{\text{charge}}{\overset{\text{discharge}}{\rightleftarrows}} Li^+ + NiO_2 + e^- \quad (1)$$

As described above, generally, lithium nickelate can be synthesized by mixing nickel compound with lithium compound and baking the mixture in an oxidizing atmosphere of 600° C. to 900° C. The irregular arrangement of the crystalline structure occurring in such a high temperature atmosphere is a very serious problem.

Nickel oxide has serious disadvantages that its charging/discharging voltage characteristic varies at plural stages, e.g. four stages, and high rate discharge performance is lowered. For this reason, it cannot be an alternative of lithium cobaltate having the same layered structure. When viewed from the standpoint of electrode, this is probably because lithium nickelate is difficult to diffuse lithium ions attendant on charging/discharging reaction and the diffusion does not occur uniformly.

In order to obtain lithium nickelate having a uniform structure, attempts of synthesizing at a lower temperature have been made. However, its solid-state baking, whose reactivity becomes low, is difficult to provide a uniform sample. Therefore, the low temperature synthesizing which is different from the solid-state baking and is based on a simplified process can be demanded.

From the standpoint of cost, although the low temperature synthesizing is preferred, a useful synthesizing has not been established at present.

Further, lithium nickelate when synthesized by reacting lithium nitrate with nickel oxyhydroxide containing cobalt and when providing a uniform charging/discharging reaction can only give a dissatisfactory discharging capacity of at most about 200 mAh/g.

SUMMARY OF THE INVENTION

It is an object of the present invention to provide a positive active material which has a uniform charging/discharging characteristic and a discharging capacity exceeding the conventional substantial theoretical capacity, producing method thereof, and a battery with the positive electrode with this active material.

A positive active material according to the present invention contains lithium nickelate and cobalt (Co), and has an amorphous crystalline structure.

A lithium battery according to the present invention is equipped with the positive active material set forth above.

Further, in the present invention, the positive active material is produced by a method in which nickel hydroxide or nickel oxyhydroxide containing cobalt, lithium salt and phosphate are mixed and the material thus created are heat-treated.

According to the present invention, unlike the conventional positive electrode, the positive active material of amorphous lithium nickelate containing cobalt has a very large discharge capacity and a continuous discharge characteristic. This means that lithium ions easily diffuse into the crystal structure from the surface and also the crystal structure may not vary until the oxidized state of nickel becomes the valency of 3 or lower during discharge reaction process.

Therefore, when the positive active material according to the present invention is applied to a battery, the energy density can be improved greatly. Thus, the battery with a high capacity and long life can be obtained.

DETAILED DESCRIPTION OF THE INVENTION

Figure 1:
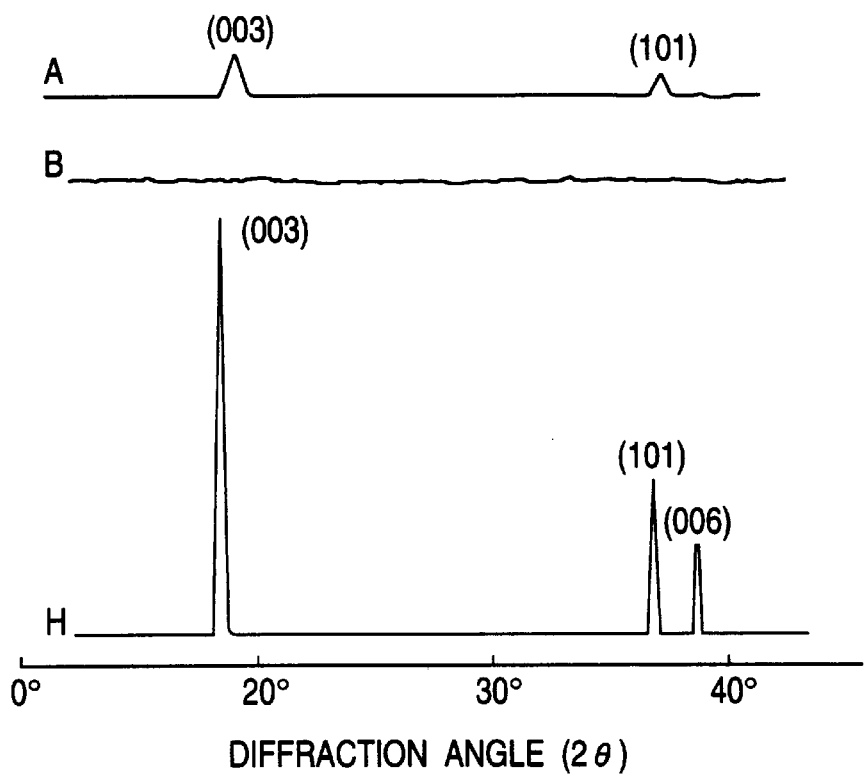
FIG. 1 is a graph showing the X-ray diffraction patterns of each of the positive active materials A and B and a conventional active material H.

Detailed description of the present invention will be described as follows with reference to the accompanying drawings.

The present invention directs to a positive active material of not the conventional lithium nickelate but amorphous nickel oxide lithium containing cobalt, which has a uniform charging/discharging characteristic and a discharge capacity exceeding 206 mAh/g which is generally regarded as the conventional substantial theoretical capacity.

The positive active material of amorphous lithium nickelate can be produced by containing phosphorus in the positive active material containing cobalt.

Specifically, it can be produced in such a manner that nickel hydroxide containing cobalt, lithium acid and phosphoric acid are mixed and heat-treated. Alternatively, it can be produced in such a manner that nickel oxyhydroxide containing cobalt, lithium acid and phosphoric acid are mixed and heat-treated.

In this case, it can be also produced in such a manner that a solution containing lithium acid and phosphoric acid is prepared to provide a solution containing lithium ions and phosphor ions. The state of nickel oxyhydroxide may be a β type, γ type or a mixed type of these types. The state of nickel hydroxide may be the β type or α type.

The positive active material of the amorphous lithium nickelate containing cobalt according to the present invention is useful when its half value of (003) plane of the X-rays diffraction peak (CuKα) is not smaller than 2θ=0.5 degree. Preferably, the half-width of (003) plane may be not smaller than 2θ=1 degree.

Addition of phosphoric acid to nickel oxyhydroxide containing cobalt causes the active material to become amorphous, and its application to the positive electrode of the alkaline battery such as a Ni—Cd battery or Ni—Zn battery gives an improved high efficiency discharging performance. Such a fact is disclosed in Unexamined Japanese Patent Publication (kokai) No. Sho. 62-19310. However, this reference does not refer to that the above material is used as a raw material of nickel hydroxide to be applied to lithium nickelate for a lithium battery.

EXAMPLES

The present invention will be explained with reference to examples. It should be noted that the present invention is not limited to the examples described below and may be modified without departing from the spirit of the present invention.

Example 1

Nickel-cobalt hydroxide powder $\{Ni_{0.98}Co_{0.02}(OH)_2\}$ of 3 mol having particle size of 5 to 50 μm containing cobalt of 2 mol % {Co/(Ni+Co)}, lithium hydroxide (LiOH) of 3 mol and phosphoric acid $H_3PO_4$ of 0.1 mol are heat-treated for 7 hours at 700° C. in an atmosphere of oxygen to provide a positive active material A of amorphous lithium nickelate containing phosphorus according to the present invention.

Example 2

Nickel-cobalt oxyhydroxide powder (β-$Ni_{0.95}Co_{0.05}OOH$) of 2 mol having particle size of 5 to 50 μm containing cobalt of 5 mol % {Co/(Ni+Co), a water solution containing lithium hydroxide of the same equipment amount, and hypophosphorus lithium acid ($LiH_2PO_2$) of 0.2 mol are heat-treated for 10 hours at 150° C. in an argon atmosphere containing oxygen gas of 20% to provide a positive active material B of amorphous lithium nickelate containing phosphorus according to the present invention.

Example 3

Phosphoric acid $H_3PO_4$ of 35 g/l is added to a mixed water solution (PH=1.0, specific gravity of 1.65 (20° C.)) of cobalt nitrate containing cobalt of 10 mol % {Co/(Ni+Co)} and nickel nitrate, and sodium hydroxide (NaOH) solution of 4.5 mol/l is further added. The deposit thus produced is rinsed in hot water and thereafter dried at 120° C. and crushed by a ball mill. Thus, amorphous nickel hydroxide powder containing phosphorus having a particle size from 50 to 100 μm was synthesized.

The nickel powder mixed with lithium nitrate ($LiNO_3$) in their equivalent molar amount is crushed. The material thus produced is heat-treated for ten hours at 400° C. in an atmosphere of argon gas containing oxygen of 20%, thus providing a positive material C of amorphous lithium nickelate containing phosphorus according to the present invention.

Example 4

Phosphoric acid $H_3PO_4$ of 35 g/l is added to a mixed solution (pH=1.0, specific gravity 1.65 (20° C.)) of cobalt nitrate containing cobalt of 5 mol % {(Co/(Ni+Co)} and nickel nitrate. Further, a solution of sodium hydroxide of 4.5 mol/l is added to the solution.

The deposit thus created is rinsed in hot water and dried at 120° C. The deposit is crushed by a ball mill to synthesize amorphous nickel hydroxide powder containing phosphorus having a particle size from 50 to 100 μm.

The nickel powder mixed with lithium hydroxide (LiOH) in their equal amounts is crushed. The material thus created is heat-treated for ten hours at 700° C. in an atmosphere of argon gas containing oxygen of 20%, thus providing a positive material D of amorphous lithium nickelate containing phosphorus according to the present invention.

Example 5

Phosphoric acid $H_3PO_4$ of 35 g/l is added to a mixed solution (pH=1.0, specific gravity 1.65 (20° C.)) of cobalt nitrate containing cobalt of 8 mol % {(Co/(Ni+Co)} and nickel nitrate. Further, a solution of sodium hydroxide of 4.5 mol/l is added to the solution.

The deposit thus produced is rinsed in hot water and dried at 120° C. The deposit is crushed by a ball mill to synthesize amorphous nickel hydroxide powder containing phosphorus having a particle size from 50 to 100 μm.

This nickel powder of 3 mol is mixed with potassium peroxydisulfate of 6 mol in an sodium hydroxide of 2 mol/l and rinsed in hot water. The material thus produced is dried at 110° C. to synthesize amorphous $\beta$-$Ni_{0.92}Co_{0.08}OOH$. This amorphous $\beta$-$Ni_{0.92}Co_{0.08}OOH$ powder is mixed with 5 mol/l LiOH solution containing LiOH in equivalent molar amount at 60° C. and heat-treated at 150° C., thus providing a positive active material E of amorphous lithium nickelate.

Example 6

Phosphoric acid $H_3PO_4$ of 35 g/l is added to a mixed solution (pH=1.0, specific gravity 1.65 (20° C.)) of cobalt nitrate containing cobalt of 15 mol % {(Co/(Ni+Co)} and nickel nitrate. Further, a solution of sodium hydroxide of 4.5 mol/l is added to the solution.

The deposit thus produced is rinsed in hot water and dried at 120° C. The deposit is crushed by a ball mill to synthesize amorphous nickel hydroxide powder having a particle diameter of 50 to 100 μm containing phosphorus.

This powder is wrapped in a nickel mesh, and charged in 0.1 C (referred to the theoretical capacity of $Ni_{0.75}Co_{0.25}(OH)_2$) in a sodium hydroxide solution of 5.8 mol/l with counter electrodes of nickel plates for 15 hours. The powder is rinsed in hot water and dried, thus producing amorphous $\beta$-$Ni_{0.85}Co_{0.15}OOH$.

The nickel oxyhydroxide is mixed in a solution of lithium hydroxide of 4.5 mol/l, and dried at 120° C. to produce a positive active material F of amorphous lithium nickelate.

Example 7

Phosphoric acid $H_3PO_4$ of 35 g/l is added to a mixed solution (pH=1.0, specific gravity 1.65 (20° C.)) of cobalt nitrate containing cobalt of 20 mol % {(Co/(Ni+Co)} and nickel nitrate. Further, a solution of sodium hydroxide of 4.5 mol/l is added to the solution.

The deposit thus produced is rinsed in hot water and dried at 120° C. The deposit is crushed by a ball mill to synthesize amorphous nickel hydroxide powder having a particle diameter of 50 to 100 μm containing phosphorus of 50–100 μm.

This powder is wrapped in a nickel mesh, and charged in 0.1 C. (referred to the theoretical capacity of $Ni_{0.8}Co_{0.2}(OH)_2$) in a lithium hydroxide solution of 4.5 mol/l with counter electrodes of nickel plates for 15 hours. The powder is heat-treated, thus producing a positive active material G of amorphous lithium nickelate.

X-ray Diffraction Analysis

The positive electrode active materials of amorphous lithium nickelate according to the above examples were subjected to the X-rays diffraction analysis under the following condition.

Measurement Condition

Output Voltage: 30 kV

Output Current: 20 mA

FIG. 1 is a graph showing the results of the X-ray diffraction analysis of the positive materials A and B according to the present invention. The graph of FIG. 1 also shows the analysis result of the conventional lithium nickelate H produced without using phosphoric acid.

As seen from the graph, the X-ray diffraction of the conventional lithium nickelate indicates a sharp diffraction peak, whereas the lithium nickelate A according to the present invention indicates broad diffraction peaks. This verifies that the lithium nickelate A is amorphous.

Particularly, the lithium nickelate B has no diffraction peak and hence is amorphous.

Like the result of the material B, that of the lithium nickelates C, D, E, F and G according to the present invention have been verified that they are amorphous.

Discharging Test

A mixed powder of 100 parts of each of the above material and 8 parts of acetylene black was modified into paste by n-methyl-2-pyrrolidole solution of 60 ml containing polyvinylidene fluoride of 1%. Foamed nickel with porosity of 90% was filled with the paste. It was dried at 120° C. to fabricate a positive electrode having a size of 30mm×40 mm×0.8 mm and nominal capacity of 300 mAh.

A sheet of the positive electrode thus prepared, two sheets of metallic lithium having the same size and a mixed solution of 300 ml of ethylene carbonate and diethyl carbonate containing lithium perchlorate of 1 mol/l in an electrolyte were used to fabricate sample batteries A, B, C, D, E, F and G (which correspond to the positive active materials according to the respective examples of the present invention).

The positive electrode was charged to 4.2 V (versus metallic lithium) at 15 mA and thereafter 2.0 V at 30 mA. The resultant capacity of the battery for the weight of the active material is shown in Table 1.

TABLE 1

| Positive Electrode Plate | Discharging Capacity (mAh/g) |
| --- | --- |
| A | 220 |
| B | 235 |
| C | 240 |
| D | 230 |
| E | 265 |
| F | 280 |
| G | 300 |
| H | 150 |

As seen from the table, the capacity of the battery using the positive electrode according to the present invention is in the range of 220 to 300 mAh/g which is much larger than 150 mAh in the battery using the conventional positive electrode.

Each of the batteries A, B, C, D, E, F and G according to the present invention has the discharge characteristic of a continuous curve as compared with that of the conventional battery H. This represents that lithium is diffused uniformly in the battery according to the present invention.

Figure 2:
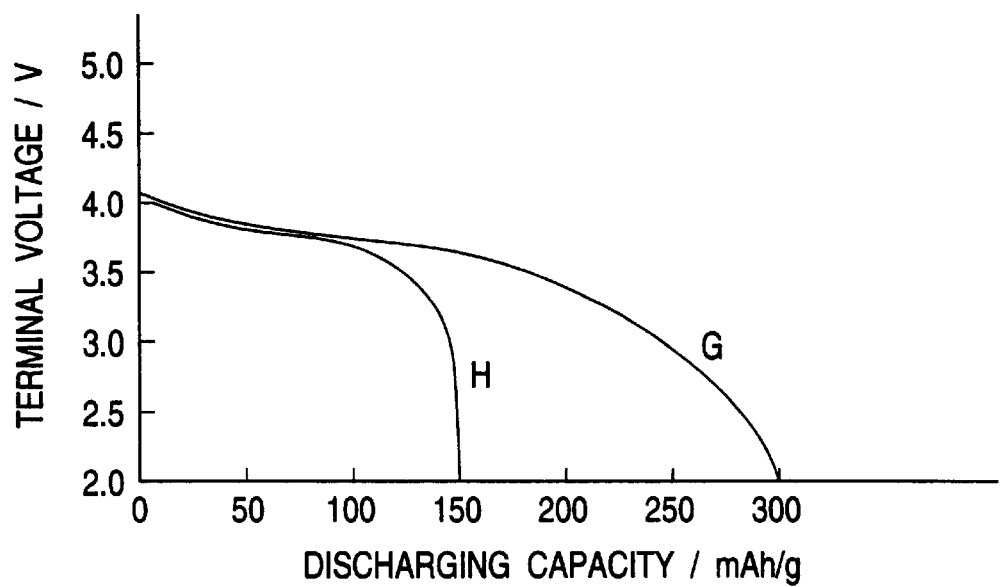
FIG. 2 is a graph showing the comparison in the discharging characteristic between the battery G according to the present invention and the conventional battery H.

As a typical example, the battery G indicative of the highest discharge capacity and the conventional battery H are shown in FIG. 2.

As seen from the graph, the discharge capacity of the battery G according to the present invention is larger than that of the battery H using the conventional positive active material, and indicates a continuous curve. In addition, while the discharge capacity of the conventional battery H is abruptly lowered at the terminal voltage of 3.5 V, particularly 3.0 V or lower, the discharge capacity of the battery G according to the present invention is lowered gradually at 3.5 V or lower.

Thus, it was ascertained that the positive active material of the amorphous lithium nickelate according to the present invention has a discharge characteristic capable of enabling discharge at 3.5 V or lower. Such a tendency appears in the battery with the positive active material being amorphous, and remarkable in a range of the contents of cobalt of 2 to 60 mol % (Co/(Ni+Co)), more preferably, 10 to 20 mol The above tendency becomes remarkable as the half-width of the peak of the (003) plane of lithium nickelate in the X-ray diffraction (CuKα), and particularly remarkable when the value is 2θ=1 degree or larger. This is probably due to that the irregular arrangement of the crystal structure of the active material according to the present invention occurs and the battery having a larger surface area has been obtained.

It is important that the positive active material according to the present invention can provide a larger theoretical capacity than 275 mAh/g which is the conventional theoretical capacity.

Generally, the electrode reaction of the lithium nickelate can be represented by Equation (1) as described above. In this case, when the oxidation state of the lithium nickelate exceeds the valency of 3.75, its crystal structure becomes unstable. For this reason, the highest charging voltage is set for the vicinity of 4.2 V for metallic lithium. Thus, the theoretical capacity which can actually be used is 206 mAh/g by the 0.75 electron change reaction in Equation (2).

(2)

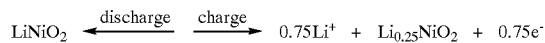

However, the battery using the positive active material according to the present invention could provide the discharge capacity higher than the theoretical value even when the oxidation state of nickel has the valency of 3.75.

In view of this fact and the fact that discharge can occur at the discharge voltage of 3.5 V or lower, it can be seen that the discharge can occur in a region with the discharge depth lower than the valency of 3 of nickel. As described above, although discharging can occur in lithium nickelate with the valency of 3 or lower, it is reported that the crystal structure varies and the discharging potential is discontinuous. On the other hand, in the case of the present invention, the discharging potential varies continuously. This probably means that when the lithium nickelate is amorphous as in the present invention, lithium ions easily diffuse into the crystal structure from the surface, and with the crystal structure being maintained, the discharging can occur with the valency of 3 or lower.

The theoretical capacity in this case is 448 mAh/g of the 1.75 electron charge reaction whose discharged state can be represented by $Li_2NiO_2$ and whose charged state can be represented by Equation (3) of $Li_{0.25}NiO_2$. Further, assuming that the charged state is $NiO_2$, it is 512 mAh/g.

(3)

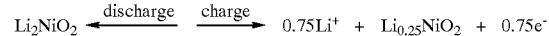

What is claimed is:

1. A positive active material comprising lithium nickel-cobaltate having an amorphous crystalline structure.

2. A positive active material according to claim 1, wherein a content of cobalt (Co) is in the range of 2 to 60 mol % (Co/(Ni+Co)).

3. A positive active material according to claim 1, wherein lithium nickel-cobaltate is $Li_xNi_{1-y}Co_yO_2$ ($x \geq 1$; $0.02 \leq y \leq 0.6$).

4. A positive active material according to claim 1, further comprising phosphorus.

5. A positive active material according to claim 1, wherein a half-width of (003) plane of (CuKα) at an X-ray diffraction peak of lithium nickel-cobaltate is not smaller than 2θ=0.5 degree.

6. A lithium battery having a positive active material comprising lithium nickel-cobaltate having an amorphous crystalline structure.

7. A lithium battery according to claim 6, wherein a content of cobalt (Co) is in the range of 2 to 60 mol % (Co/(Ni+Co)).

8. A lithium battery according to claim 6, wherein lithium nickel-cobaltate is $Li_xNi_{1-y}Co_yO_2$ ($x \geq 1$; $0.02 \leq y \leq 0.6$).

9. A lithium battery according to claim 6, further comprising phosphorus.

10. A lithium battery according to claim 6, wherein a half-width of (003) plane of (CuKα) at an X-ray diffraction peak of lithium nickel-cobaltate is not smaller than 2θ=0.5 degree.

11. A method of producing positive active material of lithium nickel-cobaltate comprising the steps of:

mixing lithium salt, phosphoric acid and at least one of nickel hydroxide containing cobalt and nickel oxyhydroxide containing cobalt; and heat-treating the mixed material.

12. A method of producing positive active material of lithium nickel-cobaltate according to claim 11, wherein said lithium salt is at least one of lithium hydroxide and lithium nitrate.

13. A method of producing positive active material of lithium nickel-cobaltate comprising the step of mixing nickel oxyhydroxide containing cobalt and a solution containing lithium ions and phosphoric acid ions.

* * * * *